United States Patent
Lewis

[15] 3,668,739
[45] June 13, 1972

[54] FISH CLEANING TROUGH FOR BOATS

[72] Inventor: Elbert G. Lewis, 10435 17th Street, Seattle, Wash. 98168

[22] Filed: July 31, 1970

[21] Appl. No.: 59,945

[52] U.S. Cl. ..................................................17/53, 43/55
[51] Int. Cl. ..................................................A22c 25/06
[58] Field of Search ..................................17/53, 70; 43/55

[56] References Cited

UNITED STATES PATENTS

| | | | |
|---|---|---|---|
| 2,560,054 | 7/1951 | Wells | 43/55 |
| 3,561,043 | 2/1971 | Breckenridge et al. | 17/53 |
| 2,795,888 | 6/1957 | Garland | 43/55 |
| 3,141,257 | 7/1964 | Stull | 43/55 |

*Primary Examiner*—Lucie H. Laudenslager
*Attorney*—Roy E. Mattern, Jr.

[57] ABSTRACT

A fish-cleaning trough adapted to be easily mounted to or removed from the gunwale of a boat provides a convenient means of supporting a fish as it is cleaned during motions of a boat. The trough is suspended over the water as the fish are cleaned to facilitate disposal of wastes and it is partially open at the ends so that rinse water and organic wastes can easily run out, while the fish remains confined to the trough.

The trough is attached to the side of a boat by utilizing securing means including pivotal brackets, hinges, and/or adjustable clamps. Materials used are plastic, wood, galvanized metals, or other protected metals to avoid and/or to inhibit corrosion and rusting.

2 Claims, 4 Drawing Figures

PATENTED JUN 13 1972

3,668,739

INVENTOR.
ELBERT G. LEWIS
BY
Roy Mattern Jr.
ATTORNEY

FISH CLEANING TROUGH FOR BOATS

BACKGROUND OF INVENTION

Particularly in primitive areas, fishermen are often confronted with the problem of approaching wild-animals when they attempt to clean their fish ashore. These often dangerous wild animals in pursuit of food make it difficult for the fisherman to preserve their catch as well as themselves. In addition, even if successful in cleaning the fish, the disposal of the fish wastes is a problem. Therefore this fish cleaning trough is now provided making it possible for the fisherman to safely clean his fish alongside his boat while away from the shoreline where the wastes are quickly consumed by birds, etc. Previously, such an easily attachable, often pivotal, fish-cleaning trough was not available to any fisherman wanting to clean his otherwise quite unmanageable slippery fish while still in a boat away from shore.

SUMMARY OF INVENTION

The sportsman is provided a convenient means of cleaning fish while in his boat and afloat away from shore by having available a trough to hold an otherwise unmanageably slippery fish alongside his boat and over the water. The trough is removably fastened and may also be pivotally mounted to provide confining trough structures to receive a freshly caught fish at anytime to be immediately cleaned while afloat. The fisherman no longer must try to hold a slippery fish by hand to eviscerate it risking its loss, or alternatively awaiting the return to shore to clean the fish in other land based facilities. The partially open ends of the trough allow rinse water and organic waste to pass easily and conveniently into the water below.

In one embodiment, the trough is easily attached to or removed from a boat by using two attached "C-clamps" which utilize finger operated tightening screws with a swivel clamping end to enable them to conform to the tapered and curved side of a boat. Further conformance is possible for the "C-clamps," in turn, may be attached to or removed from the trough by using a "wing nut" and bolt providing both pivoting and fastening functions. Also the entire fish cleaning trough is constructed from corrosion-resistant materials which will prevent untimely deterioration of the cleaning trough in its outdoor environment.

DRAWINGS OF PREFERRED EMBODIMENTS

DESCRIPTION OF PREFERRED EMBODIMENTS

Figure 1:
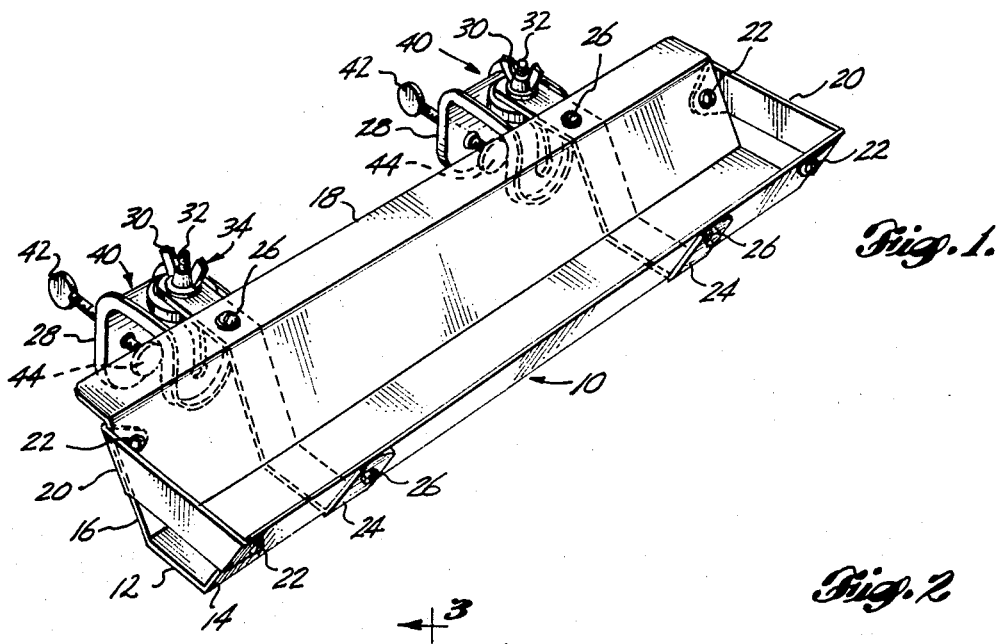
FIG. 1 is a perspective view of the upper side of the fish trough illustrating the concave trough volume, the partially open ends, the attached brackets which can be utilized to connect the trough to "C-clamps," and the "C-clamps" themselves.

As illustrated in the drawings, a formed fish cleaning trough 10 is secured to a gunwale 11 of a boat to receive fish for cleaning purposes. It has a bottom 12; a sloping farside 14; a sloping nearside 16, which has horizontal top lip or edge 18; and partial end closures 20 located at the top and held in place by fasteners 22, enabling rinse water and wastes from the fish to exit easily into the water below.

The trough 10 is supported from below by spaced brackets 24 which pass under it in two places and are connected to the trough 10 by screws or rivets 26. These brackets 24 extend in turn beyond the lip 18 to be pivotally connected to "C-clamps" 28 by means of wing nuts 30 and threaded bolts 32, serving as the pivotal fastening assembly 34 which also passes through a receiving hole 36 in the top 38 of the "C" clamp 28.

Figure 2:
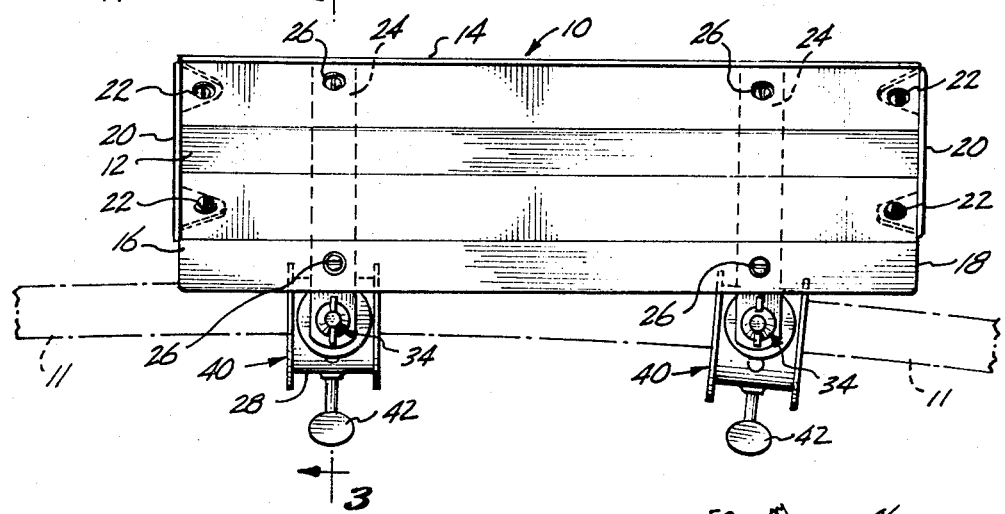
FIG. 2 is a top view of the trough and the "C-clamps" with dotted lines illustrating the brackets attached to the underside of the trough, and also how the "C" clamps are secured to the gunwale of a boat.
Figure 3:
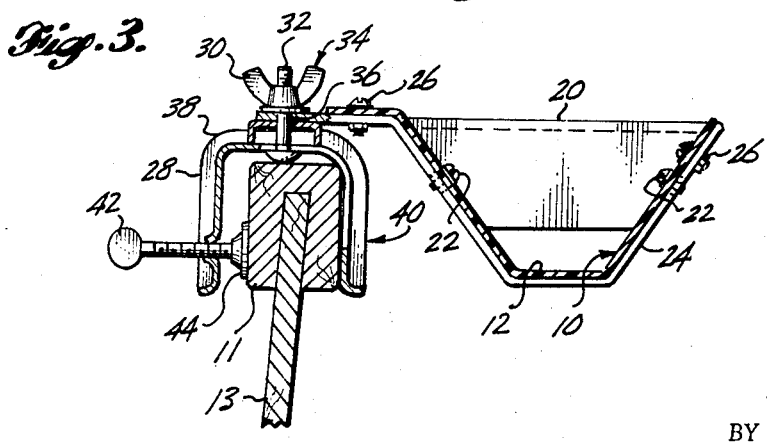
FIG. 3 is a sectional view taken in the plane of line 3—3 of FIG. 2 and looking in the direction of the arrows to illustrate the "C" clamps, the pivotal fasteners, the boat gunwale and the trough itself with its partially enclosed ends.

This assembly 40 of the trough 10, brackets 24, pivotal fastener assembly 34 and "C" clamps 28 is then connected to the gunwale 11 or side 13 of a boat by tightening the two "C" clamps 28 utilizing a finger operated clamping screw 42 having a swivel contacting head 44. As shown in FIG. 2, the gunwhale 11 may be curved yet fish cleaning trough 10 is readily secured, as the "C" clamps 28 are easily pivoted using their pivotal fastening assembly 34 to match the curvature of the gunwhale 11 or boat side 13.

Figure 4:
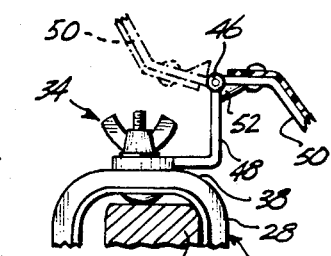
FIG. 4 is a partial sectional view, similar to FIG. 3, showing the addition of a hinge means.

Also there may be times when a fisherman prefers to leave the fish cleaning trough 10 clamped to the gunwhale 11 yet have it stored within the outer contour of the boat side 13 to avoid interference with a dock or an adjacent boat. Therefore, a hinged structure 46 is added by using a different two piece bracket 48, 50 having a stop 52, as illustrated in FIG. 4. Then subsequent to its use, fish cleaning trough 10 is pivoted back over the gunwhale 11 to be in the interior of a boat.

SUMMARY OF ADVANTAGES

A fisherman now has an easily mounted or removed, optionally pivotal, and conveniently portable, fish cleaning trough for attachment to a boat to clean fish over the water alongside the boat. It is made compactly, from corrosion-resistant materials to fit any boat to meet the requirements of a boat fisherman who desires to use the lake, stream, river, or sea water to clean the fish and flush the cuttings conveniently through the open trough ends back into the water below and alongside the boat.

By having such a fish cleaning trough available, the fisherman is able to clean his fish without returning to shore, where oftentimes, the fish cleaning operations attract wild animals and/or also the controlled disposition of the fish wastes is often difficult. Whereas, the cleaning of fish while yet afloat in a boat is done safely and the fish wastes are readily assimilated by birds and also by other water creatures.

I claim

1. A fish cleaning trough adapted to be mounted on a boat and extended over the side, so as a fish is cleaned the removed fish portions may be collected clear of the interior and the outside side of the boat, comprising:
    a. a fish trough body comprising, in turn two spaced inwardly sloping sides, a bottom integral with the sloping sides, a top ledge integral with one sloping side, and partial end abutments secured between the ends of the sloping sides to leave an exit space below the end abutments through which the removed fish portions may be directed for collection clear of the interior of the boat and the outside side of the boat;
    b. supports secured to the fish trough body and extending transversely therefrom to position the trough body well away from the interior of the boat and the outside side of the boat; and
    c. adjustable clamping means rotatably mounted on the supports of the fish trough body to removably secure the fish cleaning trough to boats with the partial rotation of the adjustable clamping means occurring to accommodate the various curved sides of many boats.

2. A fish cleaning trough, as claimed in claim 1, wherein hinge components are included in the overall assembly so the fish trough body may be pivoted back over the boat edge toward the interior of the boat in preparation for coming alongside a dock or another boat without any necessity of loosening the rotatably adjustable clamping means, thereby keeping the fish cleaning trough well secured to a boat.

* * * * *